(12) United States Patent
Choi

(10) Patent No.: US 7,686,333 B2
(45) Date of Patent: Mar. 30, 2010

(54) AIRBAG CUSHION STRUCTURE WITH VARIABLE INNER VENT HOLE

(75) Inventor: Hyeongho Choi, Gwangmyeong-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 0 days.

(21) Appl. No.: 12/327,731

(22) Filed: Dec. 3, 2008

(65) Prior Publication Data
US 2009/0152846 A1    Jun. 18, 2009

(30) Foreign Application Priority Data
Dec. 15, 2007    (KR) .................. 10-2007-0131759

(51) Int. Cl.
*B60R 21/16* (2006.01)
(52) U.S. Cl. .................. 280/743.2; 280/736
(58) Field of Classification Search .............. 280/739, 280/740, 743.2, 730.2, 736, 743.1
See application file for complete search history.

(56) References Cited

U.S. PATENT DOCUMENTS

| | | | |
|---|---|---|---|
| 5,282,646 A * | 2/1994 | Melvin et al. ............... | 280/729 |
| 5,853,191 A * | 12/1998 | Lachat .................... | 280/730.2 |
| 7,445,237 B2 * | 11/2008 | Boyle et al. ................ | 280/739 |

FOREIGN PATENT DOCUMENTS

| | | | |
|---|---|---|---|
| JP | 2005014863 | | 1/2005 |
| JP | 2005014864 A | * | 1/2005 |
| KR | 1020040041350 A | | 5/2004 |
| KR | 1020070032079 A | | 3/2007 |

* cited by examiner

*Primary Examiner*—Faye M. Fleming
(74) *Attorney, Agent, or Firm*—Morgan, Lewis & Bockius LLP

(57) ABSTRACT

The present invention provides an airbag cushion structure with variable inner vent holes, which has at least two chambers into which an inflation gas is delivered from an inflator. According to the airbag cushion structure, safe inflation performance of an airbag is maximized in an early inflation by increasing the size of inner vent holes, passenger collision energy absorption performance of the airbag is secured in the latter inflation by decreasing the size of the inner vent holes. Further, it is possible to improve both the safe inflation performance and passenger collision energy absorption performance of the airbag when a passenger-contact portion of the airbag cushion that contacts with the passenger's head and chest is close to a region of the airbag cushion that inflates, such as a crash pad with an airbag cushion, by increasing the size of the inner vent holes and decreasing the size of the inner vent holes around a region where the passenger-contact portion contacts the passenger.

11 Claims, 8 Drawing Sheets

AIRBAG CUSHION STRUCTURE WITH VARIABLE INNER VENT HOLE

CROSS-REFERENCE TO RELATED APPLICATION

The present application is based on and claims priority to Korean Patent Application Number 10-2007-0131759 filed Dec. 15, 2007, the entire contents of which is incorporated herein for all purposes by this reference.

BACKGROUND OF THE INVENTION

1. Field of the Invention

The present invention relates to an airbag cushion structure, particularly a structure of an inner vent hole that is formed to allow an inflation gas to flow into a plurality of chambers formed in an airbag cushion.

2. Description of Related Art

Items generally included in an airbag equipped in a vehicle are divided into, first, passenger collision energy absorption performance and, second, safe inflation performance.

The passenger collision energy absorption performance is the ability of an airbag cushion to absorb the passenger's kinetic energy in a vehicle collision, in which the amount of absorbed energy depends on whether the passenger fastens the seat belt, or the vehicle's collision velocity.

Further, the safe inflation performance is to minimize the impact energy applied to a passenger from the airbag cushion that inflates, in which the performance depends on the pressure of an inflator and the size of a vent hole of the airbag cushion.

FIG. 1 shows an airbag cushion 504 with a base chamber 500 and a chest chamber 502 that has inflated. By way of example, the relationships of a vent hole of airbag cushion 504 with the passenger collision energy absorption performance and the safe inflation performance are described as follows.

The passenger collision energy absorption performance largely depends on the size of an outer vent hole 506 formed through airbag cushion 504, when both base chamber 500 and chest chamber 502 inflate.

In this example, that is, both base chamber 500 and chest chamber 502 are under the pressure of the inflation gas, such that an inner vent hole 508 through which the chambers communicate with each other cannot function as a vent hole that allows the inflation gas flow.

On the other hand, when only base chamber 500 is provided, outer vent hole 506 and inner vent hole 508 are both available and the passenger collision energy absorption performance and the safe inflation performance depend on the sizes of the two both holes.

That is, when the sizes of outer vent hole 506 and inner vent hole 508 are large, the safe inflation performance increases whereas the passenger collision energy absorption decreases.

Therefore, determining the sizes of the vent holes of airbag cushion 504 involves a contradiction: the need to increase the vent holes for the passenger collision energy absorption performance or to decrease the vent holes for the safe inflation performance.

However, outer vent hole 506 is an important factor when base chamber 500 and chest chamber 502 are both provided and inner vent hole 508 is influential when only base chamber 500 is provided. As a result, it should be needed to decrease inner vent hole 508 for the passenger collision energy absorption performance and increase inner vent hole 508 for safe inflation performance of the airbag.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for an airbag cushion structure with variable inner vent holes, which has at least two chambers into which an inflation gas is delivered from an inflator. According to the airbag cushion structure, safe inflation performance of an airbag is maximized in an early inflation by increasing the size of inner vent holes; however, passenger collision energy absorption performance of the airbag is secured in the latter inflation by decreasing the size of the inner vent holes. Further, it is possible to improve both the safe inflation performance and passenger collision energy absorption performance of the airbag when a passenger-contact portion of the airbag cushion that contacts with the passenger's head and chest is close to a region of the airbag cushion that inflates, such as a crash pad with an airbag cushion. This is accomplished by increasing the size of the inner vent holes and decreasing the size of the inner vent holes around a region where the passenger-contact portion contacts the passenger.

An airbag cushion structure with variable inner vent hole of the invention may includes a diaphragm, a tether, a tether guide, a tether guide hole, an inner vent hole, a tether vent hole, and/or a shield. The diaphragm separates a first chamber directly receiving an inflation gas from an inflator, from a second chamber receiving the inflation gas from the first chamber. The tether is disposed close to the diaphragm. The tether guide has both ends attached to the diaphragm, covering the tether. The tether guide hole is formed through the tether guide. The inner vent hole is formed through the diaphragm, corresponding to the tether guide hole. The tether vent hole is formed through the tether, corresponding to the tether guide hole and inner vent hole. The shield is formed on the tether positioned between the tether guide hole and the inner vent hole, and blocks the tether guide hole from the inner vent hole. The tether guide hole, the inner vent hole, and the tether vent hole communicate with each other, before the airbag cushion starts to inflate.

The tether guide may be fixed to the diaphragm to ensure that the tether is at least partially in contact with the diaphragm.

The shield may be formed at a portion of tether between the tether guide hole and the inner vent hole, with the first chamber open, and partially block the tether guide hole from the inner vent hole.

The first chamber may be a base chamber that absorbs impact applied to the passenger's upper body including the head, at the upper portion of the airbag cushion, and the second chamber may be a chest chamber that protects the passenger's chest and abdomen, at the lower portion of the airbag cushion.

The tether and the tether guide may be disposed under the diaphragm.

The inner vent hole of the diaphragm may be formed in a plurality of numbers and the tether guide hole of the tether guide may be formed in the same number as the inner vent hole, communicating with each other. Further, the tether vent hole may be formed in the same number as the inner vent hole and the tether guide hole, communicating with each other. Furthermore, the shield has shield vent holes that are formed less in number than the tether vent hole and communicate with parts of the inner vent hole and the tether guide hole.

The shield may be the tether itself without any hole to completely block the inner vent hole and the tether guide hole.

The present invention provides an airbag cushion structure with variable inner vent holes, which has at least two chambers into which an inflation gas is delivered from an inflator. According to the airbag cushion structure, safe inflation performance of an airbag is maximized in an early inflation by increasing the size of inner vent holes, while passenger collision energy absorption performance of the airbag is secured in the latter inflation by decreasing the size of the inner vent holes. Further, it is possible to improve both the safe inflation performance and passenger collision energy absorption performance of the airbag by increasing the size of the inner vent holes when a passenger-contact portion of the airbag cushion that contacts with the passenger's head and chest is close to a region of the airbag cushion that inflates, such as a crash pad with an airbag cushion, and decreasing the size of the inner vent holes around a region where the passenger-contact portion contacts the passenger.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
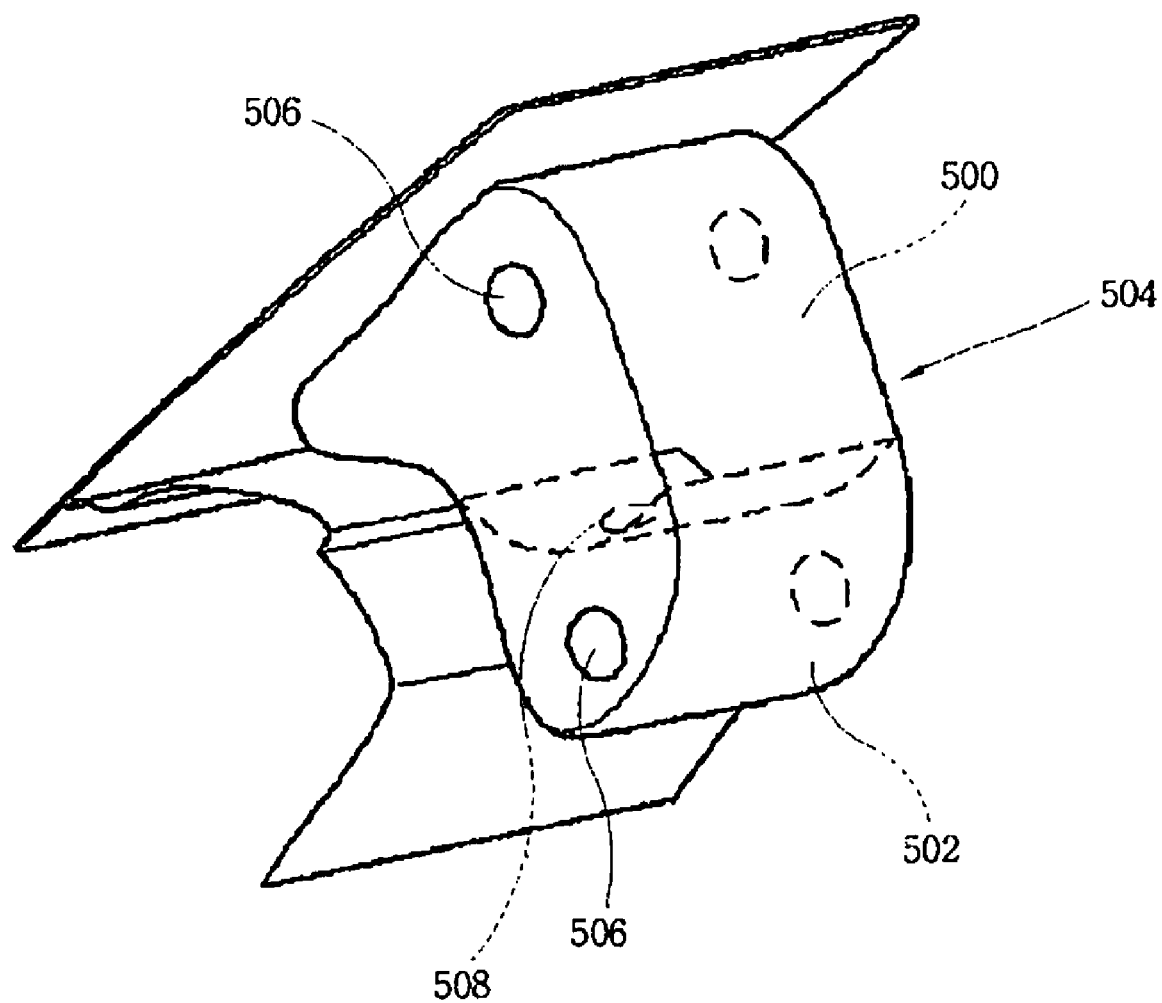
FIG. 1 is a view illustrating inflation of an exemplary airbag cushion.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIGS. 2 to 8, an airbag cushion structure according to various embodiments of the invention includes: a diaphragm 1 that separates a first chamber 13 directly receiving an inflation gas from an inflator, from a second chamber 15 receiving the inflation gas from first chamber 13; a tether 3 that is positioned close to diaphragm 1; a tether guide 5 that has both ends attached to diaphragm 1, covering tether 3 such that tether 3 is at least partially in contact with diaphragm 1; tether guide holes 7 that are formed through tether guide 5; inner vent holes 9 that are formed through diaphragm 1, corresponding to tether guide holes 7; tether vent holes 11 that are formed through tether 3, corresponding to tether guide holes 7 and inner vent holes 9; a shield that is formed of a portion of tether 3 between tether guide holes 7 and inner vent holes 9, with first chamber 13 open, and partially blocks tether guide holes 7 from inner vent holes 9. Before the airbag cushion starts to inflate, tether guide holes 7, inner vent holes 9, and tether vent holes 11 communicate with each other and are tentatively fixed.

Figure 4:
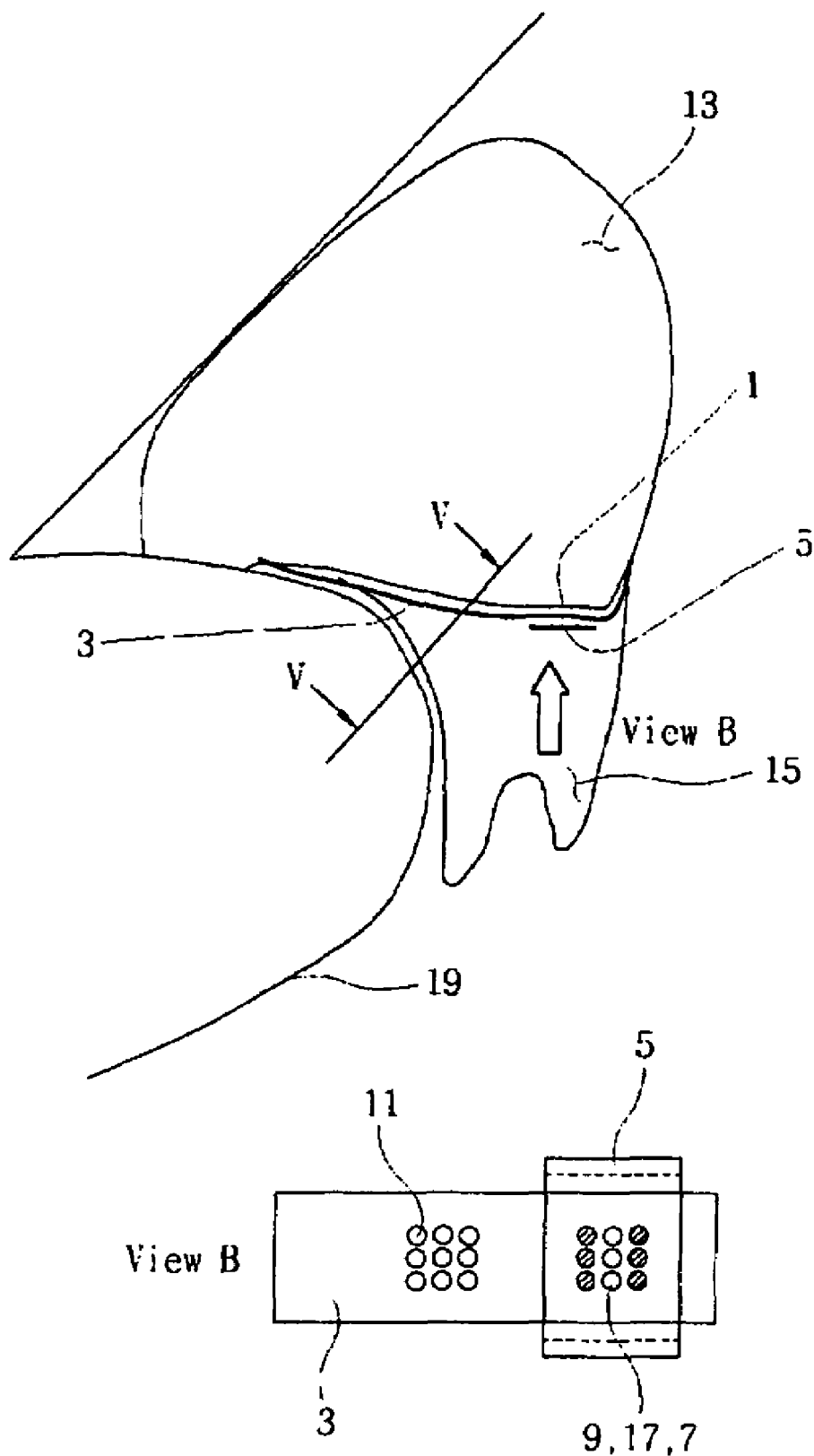
FIG. 4 is a view illustrating the latter inflation of the airbag cushion shown in FIG. 2.
Figure 5:
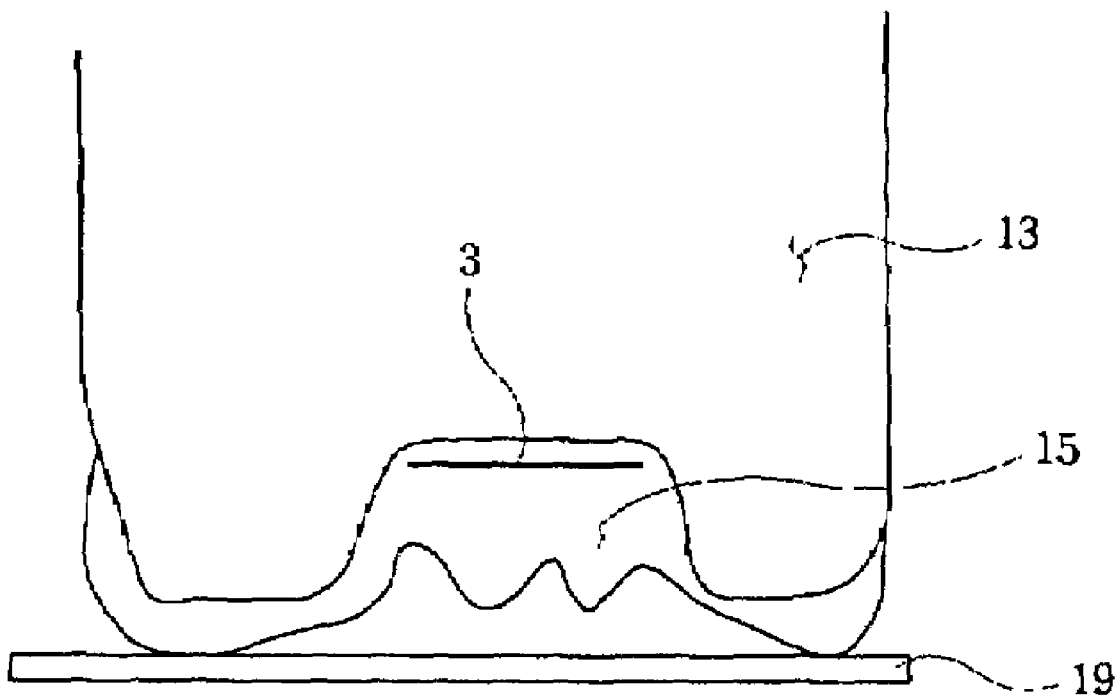
FIG. 5 is a cross-sectional view taken along the line V-V of FIG. 4.
Figure 6:
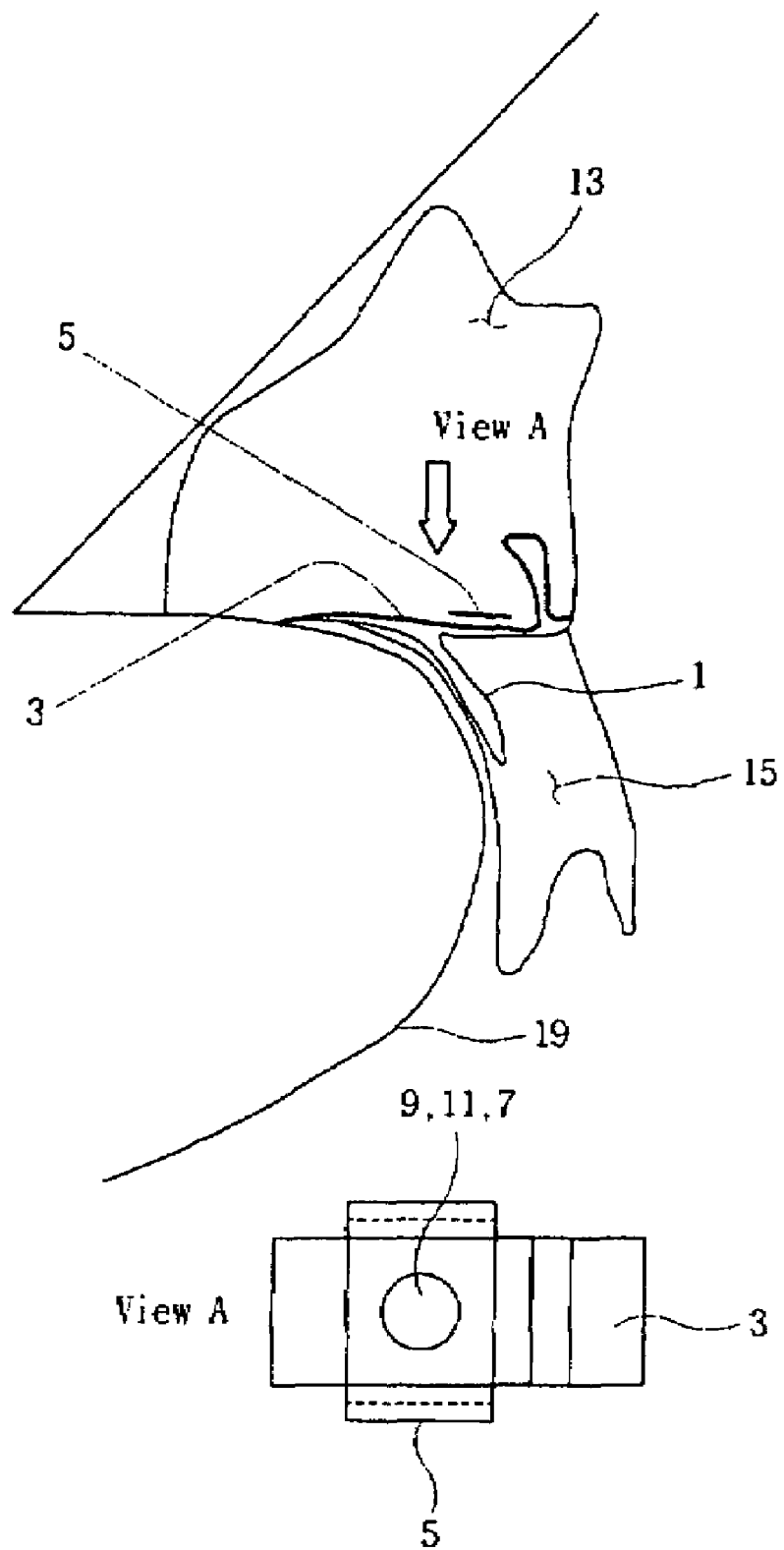
FIG. 6 is a view showing an exemplary airbag cushion with variable inner vent holes according to the present invention, in an early inflation.
Figure 7:
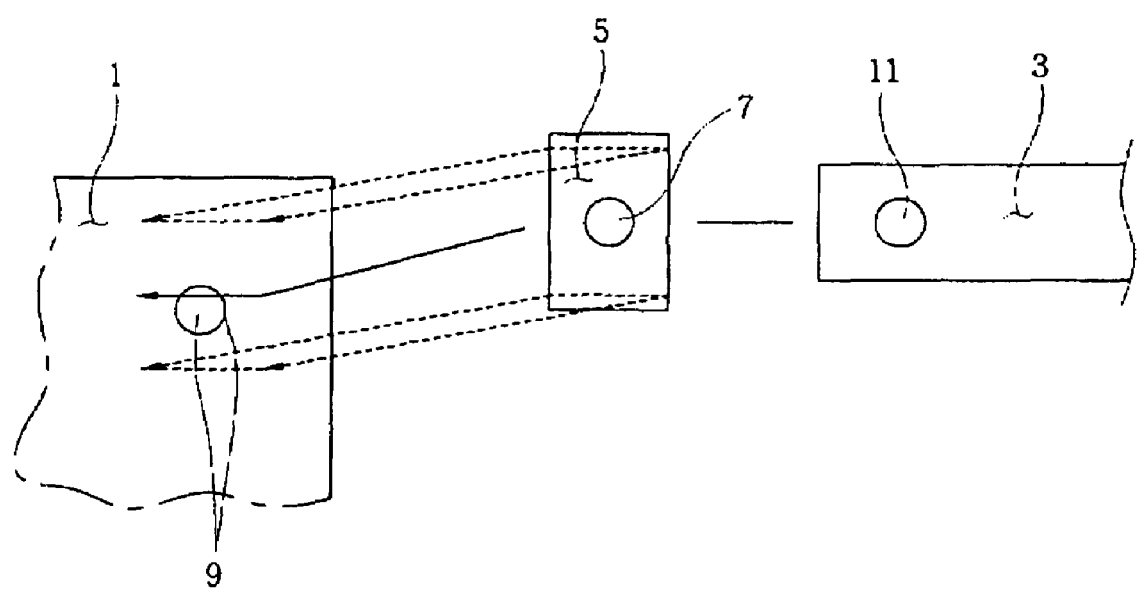
FIG. 7 is a view showing the diaphragm, tether guide, and tether shown in FIG. 6.
Figure 8:
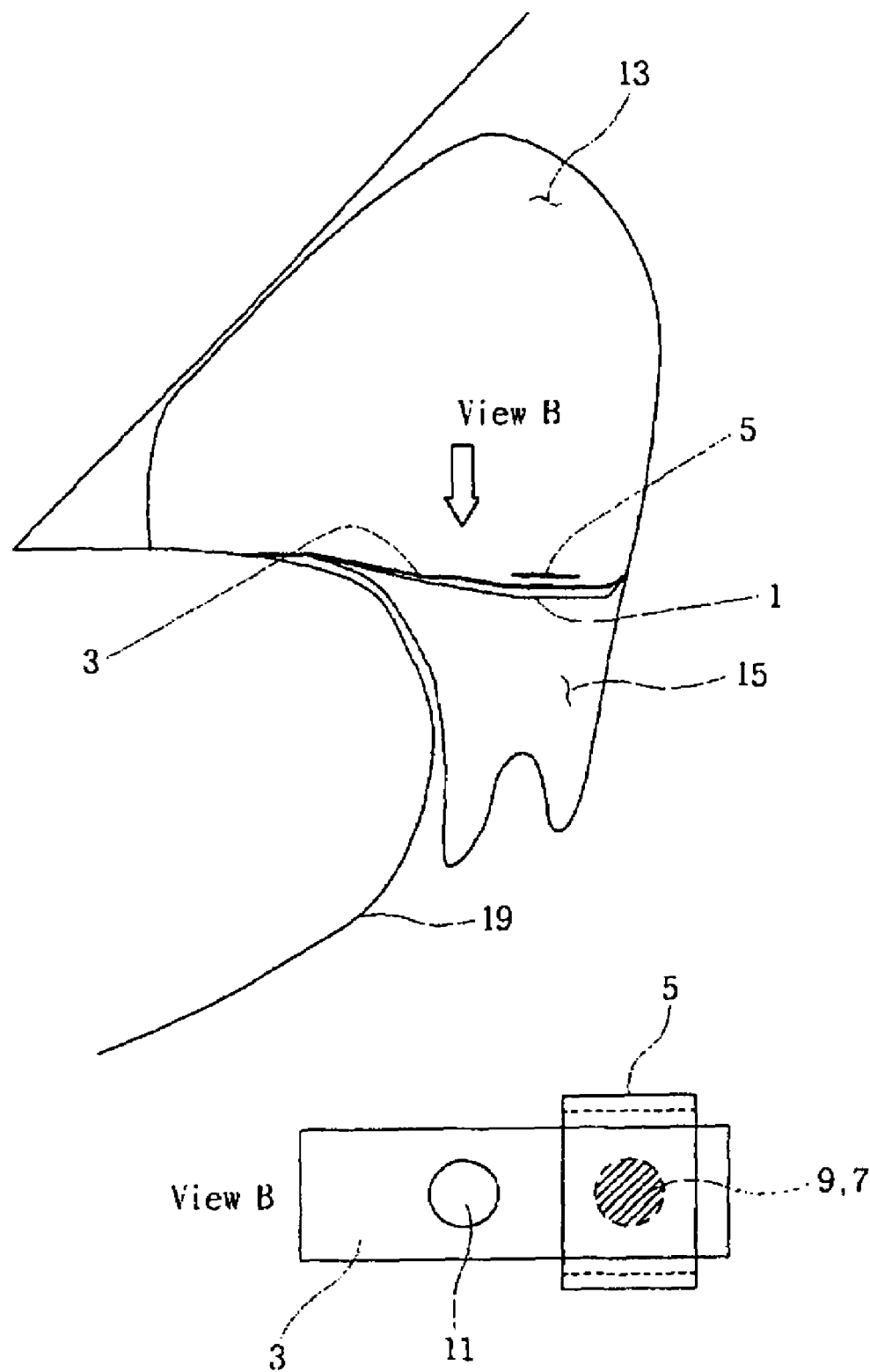
FIG. 8 is a view illustrating the latter inflation of the airbag cushion shown in FIG. 6.

FIGS. 2 to 5 show an exemplary embodiment and FIGS. 6 to 8 show another exemplary embodiment.

It is described in the above that tether guide holes 7, inner vent holes 9, and tether vent holes 11 communicate and are tentatively fixed when the bag is not inflated. Tether 3 is tentatively fixed by sewing such that tether guide holes 7, inner vent holes 9, and tether vent holes 11 communicate when the airbag cushion is in an early inflation, and as a force is applied to tether 3 by the airbag cushion inflating, tether 3 is unsewn and changes in the relative position to tether guide 5.

Further, first chamber 13 is a base chamber that absorbs impact applied to the passenger's upper body including the head, at the upper portion of the airbag cushion, and second chamber 15 is a chest chamber that protects the passenger's chest and abdomen, at the lower portion of the airbag cushion. The airbag cushion according to this embodiment is similar as the airbag cushion shown in FIG. 1.

Various aspects of the present invention, however, may be applied to other airbag cushions than this embodiment, as long as inner chambers are divided and an inflation gas sequentially flows into the chambers from an inflator.

Referring to the embodiment shown in FIGS. 2 to 5, tether 3 and tether guide 5 are disposed under diaphragm 1.

According to various embodiments, nine inner vent holes are formed through diaphragm 1 and the tether guide holes 7 of tether guide 5 are formed in the same number as inner vent holes 9, communicating with each other. Further, tether vent holes 11 of tether 3 are formed in the same number as inner vent holes 9 and tether guide holes 7, communicating with each other, and the shield has shield vent holes 17 that are formed in less number than tether vent holes 11 and communicate with parts of inner vent holes 9 and tether guide holes 7. In various embodiments there are three shield vent holes 17.

Figure 2:
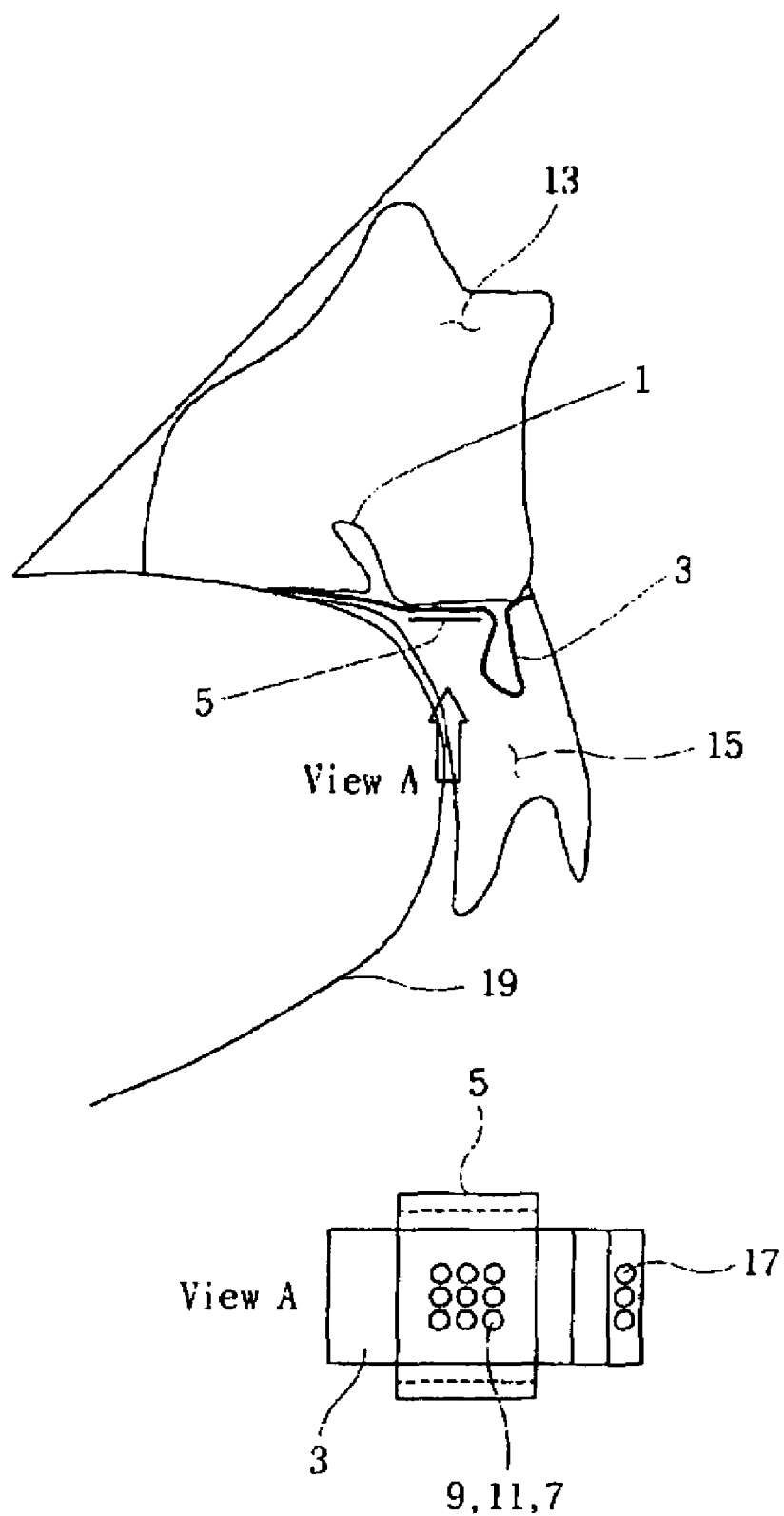
FIG. 2 is a view showing an exemplary airbag cushion with variable inner vent holes according to the present invention, in an early inflation.
Figure 3:
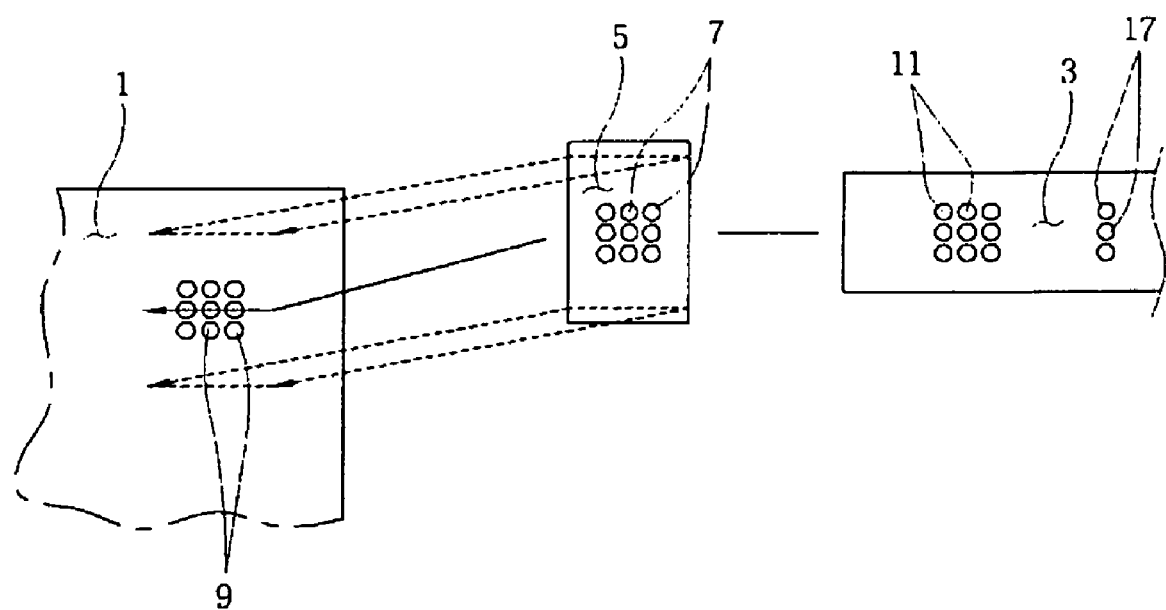
FIG. 3 is a view showing an exemplary diaphragm, tether guide, and tether shown in FIG. 2.

Inflation of the airbag cushion having the above configuration is described with reference to FIGS. 2 and 4. When the airbag cushion is in an early inflation, as shown in FIG. 2, first chamber 13 does not completely inflate, and inner vent holes 9, tether vent holes 11, and tether guide holes 7 communicate with each other such that as much as possible amount of inflation gas flows into second chamber 15 through inner vent holes 9.

That is, in the airbag cushion, a passenger-contact portion that contacts with the passengers head and chest is positioned close to a crash pad 19 that inflates, such that inner vent holes 9 are open in the largest size and the safe inflation performance of the airbag is maximized.

Further, in the latter inflation of the airbag cushion, as shown in FIG. 4, first chamber 13 completely inflate, and as tether 3 is pulled, shield vent holes 17 are moved between inner vent holes 9 and tether guide holes 7.

Therefore, the amount of the inflation gas flowing from first chamber 13 into second chamber 15 through inner vent holes 9 depends on shield vent holes 17. The same effect as when the inner vent holes 9 are relatively small is obtained.

As a result, the inner vent hole area 9 decreases in size around a region where the passenger-contact portion contacts with the passenger.

On the other hand, as seen from FIG. 5, according to various embodiments, the left and right sides of first chamber 13 contact with crash pad 19, such that it is possible to prevent the first chamber 13 from hanging down. Further, tether 3 prevents the middle portion of first chamber 13 from sagging, such that the passenger's head is not pressed by crush pad 19.

Comparing the early state with the latter state in inflation of the airbag cushion according to various embodiments with reference to FIGS. 6 and 8, the principle is the same as the above-described embodiment.

This embodiment is different from the above-described embodiment in that the shield is the tether 3 itself without any hole and completely blocks inner vent holes 9 and tether guide holes 7.

According to various embodiments, diaphragm 1 and tether guide 5 have one inner vent hole 9 and one tether guide hole 7, respectively, but the important difference is that the shield, tether 3 itself, completely blocks inner vent hole 9 of diaphragm 1, rather than the number of the hole.

Further, according to various embodiments, tether 3 and tether guide 5 are positioned above diaphragm 1.

Referring to FIG. 6 illustrating the early inflation of the airbag cushion, inner vent hole 9, tether vent hole 11, and tether guide hole 7 sequentially communicate with each other and inner vent hole 9 is the most widely open in the largest size to satisfy safe inflation performance.

On the other hand, referring to FIG. 8 illustrating the base chamber that has completely inflated, tether 3 is pulled and blocks inner vent hole 9 from tether vent hole 11, such that inner vent hole 9 is completely blocked.

As described above, using an inner vent hole 9 that is variable in size, it is possible to achieve appropriate safe inflation performance and passenger collision energy absorption performance for the airbag. Therefore, it is possible to achieve an airbag cushion with safe inflation performance and passenger collision energy absorption performance.

In particular, it is possible to obtain safe inflation performance and passenger collision energy absorption performance by adjusting the size of inner vent hole 9 while considering that the safe inflation performance is required for the early inflation of the airbag cushion, that is, the passenger-contact portion of the airbag cushion is close to the region of the airbag that inflate, and the passenger collision energy absorption performance is required after the airbag has inflated, that is, when the passenger-contact portion hits the passenger.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag cushion structure with variable inner vent hole, comprising:
    a diaphragm with an inner vent hole that separates a first chamber directly receiving an inflation gas from an inflator, from a second chamber receiving the inflation gas from the first chamber via the variable inner vent hole;
    a tether with a tether vent hole that is positioned close to the diaphragm;
    a tether guide with a tether guide hole that has both ends attached to the diaphragm, covering the tether; and
    a shield that is formed on the tether positioned between the tether guide hole and the inner vent hole, and blocks the tether guide hole from the inner vent hole,
    wherein the tether guide hole, the inner vent hole, and the tether vent hole communicate with each other, before the airbag cushion staffs to inflate,
    wherein the shield is formed at a portion of tether between the tether guide hole and the inner vent hole, with the first chamber open, and partially blocks the tether guide hole from the inner vent hole, and
    wherein the first chamber is a base chamber that absorbs impact applied to the passenger's upper body including the head, at the upper portion of the airbag cushion, and the second chamber is a chest chamber that protects the passenger's chest and abdomen, at the lower portion of the airbag cushion.

2. The airbag cushion structure as defined in claim 1, wherein the tether guide is fixed to the diaphragm to ensure that the tether is at least partially in contact with the diaphragm, the inner vent hole is formed to correspond to the tether guide hole and a tether vent hole is formed to correspond to the tether guide hole and inner vent hole.

3. The airbag cushion structure as defined in claim 1, wherein the tether and the tether guide are positioned under the diaphragm.

4. An airbag cushion structure with variable inner vent hole, comprising:
    an inner vent hole of a diaphragm formed in a plurality of numbers,
    a tether guide hole of a tether guide formed in the same number as the inner vent hole, communicating with each other,
    a tether vent hole formed in the same number as the inner vent hole and the tether guide hole, communicating with each other, and
    a shield having shield vent holes that are formed in less number than tether vent hole and communicate with parts of the inner vent hole and the tether guide hole.

5. The airbag cushion structure as defined in claim 4, wherein the tether guide is fixed to the diaphragm to ensure that the tether is at least partially in contact with the diaphragm.

6. The airbag cushion structure as defined in claim 4, wherein the shield is formed at a portion of tether between the tether guide hole and the inner vent hole, with the first chamber open, and partially blocks the tether guide hole from the inner vent hole.

7. The airbag cushion structure as defined in claim 6, wherein the first chamber is a base chamber that absorbs impact applied to the passenger's upper body including the head, at the upper portion of the airbag cushion, and the second chamber is a chest chamber that protects the passenger's chest and abdomen, at the lower portion of the airbag cushion.

8. The airbag cushion structure as defined in claim 6, wherein the tether and the tether guide are positioned under the diaphragm.

9. The airbag cushion structure as defined in claim 6, wherein the shield is the tether itself without any hole to completely blocks the inner vent hole and the tether guide hole.

10. A crash pad comprising the airbag cushion structure of claim 1.

11. A vehicle comprising the crash pad of claim 10.

* * * * *